Patented Feb. 23, 1926.

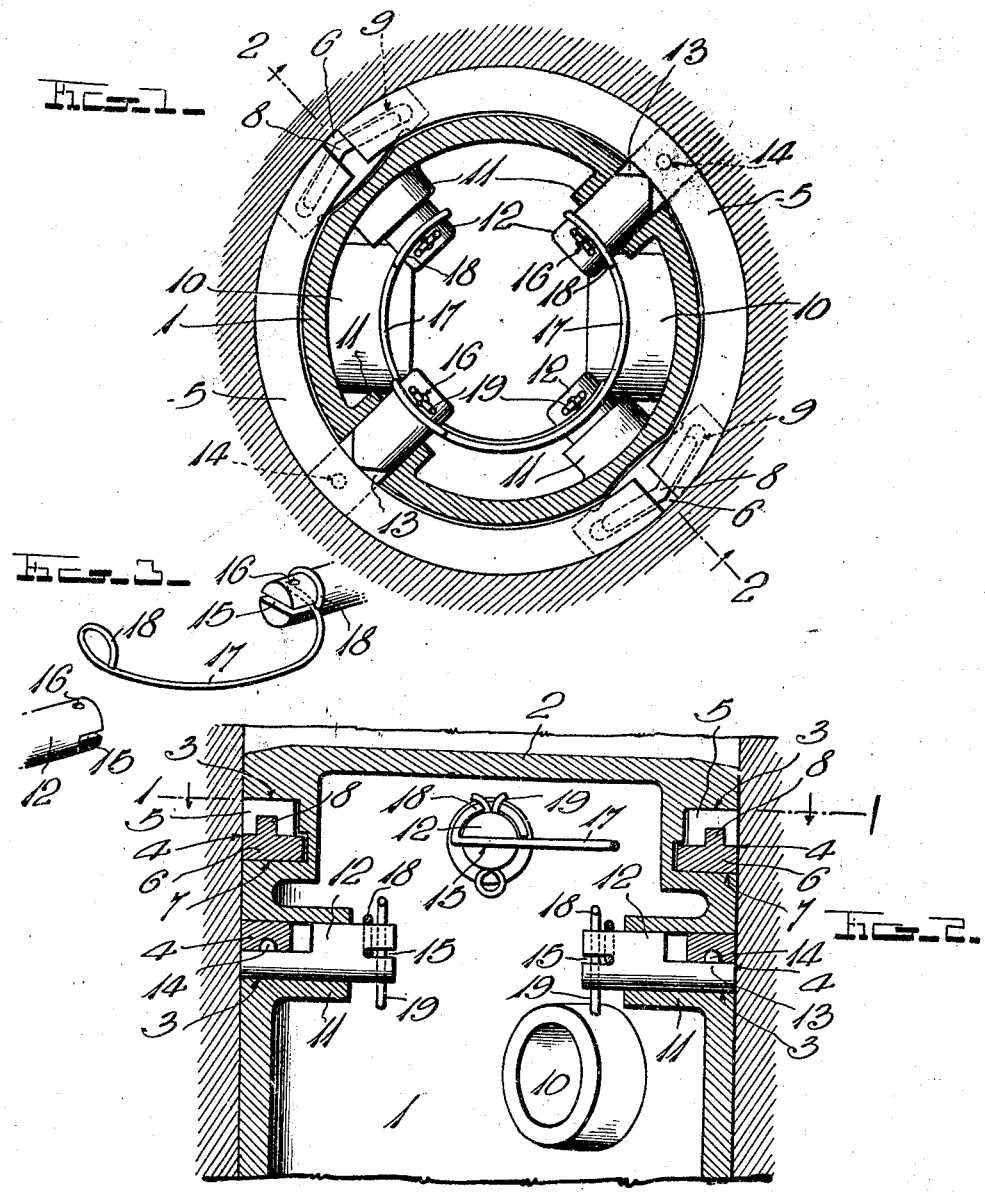

1,574,135

UNITED STATES PATENT OFFICE.

MICHAEL H. SULLIVAN, OF POUGHKEEPSIE, NEW YORK.

PISTON.

Application filed April 29, 1925. Serial No. 26,753.

*To all whom it may concern:*

Be it known that I, MICHAEL H. SULLIVAN, a citizen of the United States, residing at Poughkeepsie, in the county of Dutchess and State of New York, have invented certain new and useful Improvements in Pistons; and I do declare the following to be a full, clear, and exact description of the invention, such as will enable others skilled in the art to which it appertains to make and use the same.

This invention which relates to pistons is particularly applicable to that type of hollow pistons which have sectional piston or packing rings held in tight contact with the cylinder wall by means of springs. Heretofore it has been the practice to employ coiled springs for this purpose, but this is no longer necessary, as according to the present invention, the packing ring sections are held in tight contact with the cylinder wall by means of bowed or substantially U-shaped springs which to a certain extent follow the inner wall of the piston and therefore leave more room for the end of the connecting rod.

The advantages for this improved construction are numerous. For instance, a piston constructed in accordance with the present invention may be made entirely by a die casting process. This was not true of the other types of similar pistons which have heretofore been employed, and therefore the present type of piston is much easier and cheaper to make than the other types. Furthermore, according to the present invention, all springs which are used in a give piston are exactly the same size and are of exactly the same strength, so that they act to keep all sections of the piston ring under exactly the same pressure in contact with the cylinder wall. Thus, the improved spring means acts so as to keep the piston centered within the cylinder to a greater extent than the heretofore known types of pistons in which coiled springs were employed.

The invention will be more readily understood by reference to the following detailed description taken in connection with the accompanying drawing.

In the accompanying drawing:—

Fig. 1 is a horizontal sectional view of a piston constructed in accordance with the present invention, taken substantially on the plane indicated by the line 1—1 of Fig. 2;

Fig. 2 is a vertical or longitudinal sectional view of the piston, taken substantially on the plane indicated by the line 2—2 of Fig. 1; and Fig. 3 is a perspective view of one of the improved springs with which the piston is equipped, one end of this spring being shown coupled to one of the plungers for forcing one of the piston ring sections in contact with the cylinder wall, while another of the plungers is shown about to be connected with the other end of the spring.

In the illustrated embodiment of the invention, the numeral 1 designates a hollow piston having an integrally formed head 2 at one end and having a pair of peripheral grooves 3 cut or disposed in its outer wall adjacent the head 2, to receive sectional piston or packing rings 4. As shown particularly in Fig. 1 of the drawing, each of these rings 4 is composed of two semi-circular sections 5, the ends of which are bridged by sealing blocks 6. The sealing blocks 6 fit in recesses 7 formed in the outer wall of the piston 1 adjacent the grooves 3, and are provided with ribs 8 fitting in channels 9 formed in the ring sections 5. All of this structure is now old in the art and forms no part of the present invention.

The piston 1 is also provided as usual with trunnions 10 to receive the pin upon which the connecting rod is connected.

According to the present invention, the piston is provided with short inwardly extending hollow bosses 11. These bosses are disposed opposite the packing ring grooves 3 and two of them are provided for each groove. The bosses for each groove are disposed at diametrically opposite sides of the piston, and the bosses of one groove are disposed at right angles to the bosses of the other groove.

Disposed in the bosses 11 are plungers 12, the outer ends of which are cut away from one side as at 13 and are provided with projections 14 fitting in recesses provided in the sections 5 of the packing rings 4. In this way, the plungers 12 are connected to the sections 5 of the packing rings. The inner ends of the plungers project beyond the inner ends of the bosses 11 and are formed with notches 15 and also with apertures 16, the purpose of which will hereinafter be described.

Instead of having coiled springs surrounding the plungers 12 to force the same outwardly as was heretofore the practice, the present invention contemplates the use of curved or U-shaped springs 17. These springs may be made of any suitable material, but are preferably formed from strips of spring wire. At their ends, the springs 17 are formed into eyes 18. Portions of these eyes are intended to fit into the notches 15 formed in the inner ends of the plungers 12 as shown in the drawing, while other portions of the eyes 18 extend around portions of the plungers. After the springs 17 have been assembled with reference to the plungers 12 in this manner, cotter pins 19 are inserted through the apertures 16 to prevent the eyes 18 of the springs 17 from becoming disengaged from the inner ends of the plungers 12.

In a piston constructed as illustrated in the drawing, there are two of the springs 17. One spring has its ends engaged with the diametrically opposite plungers 12 for the two complementary sections 5 of one of the packing rings 4, while the other spring is connected to the diametrically opposite plungers of the sections of the other packing ring. Both springs follow to some extent the contour of the inner wall of the hollow piston 1, and therefore leave a considerable central space in the piston to provide room for the connecting rod which, as hereinbefore explained, is coupled to a pin mounted in the trunnions 10.

From the foregoing description taken in connection with the accompanying drawing, the construction, purpose and advantages of the invention will be readily understood so that further explanation is not necessary, but nevertheless it will be stated that by the use of the curved or U-shaped springs 17, all of the sections 5 of the packing rings will be under exactly the same amount of pressure and therefore the piston will be centered in the cylinder. Furthermore, since to provide for the improved type of piston, only two short hollow bosses 11 are necessary, the entire piston may be made by a die-casting process at less expense and in an easier manner than heretofore known types of similar pistons in which coiled springs were used.

To a person skilled in the art to which the invention appertains, numerous changes in form, proportion, and in various of the features of construction may be made without departing from the spirit and principle of the invention and without sacrificing any of the advantages thereof. For instance, the curved springs may be connected to the inner ends of the diametrically opposite plungers in numerous other ways besides the one herein disclosed. Thus, it is to be understood that changes of this nature may be made without departing from the meaning and scope of the appended claims.

I claim:—

1. In a piston construction, the combination of a hollow piston provided with a packing ring groove in its outer wall, hollow bosses extending inwardly from the inner wall of said piston, said bosses being diametrically disposed and communicating with said groove, a packing ring disposed in said groove and composed of sections, plungers disposed in said bosses and connected to the sections of said ring, and a curved spring following the inner contour of said cylinder and having its ends connected to the inner ends of said plungers.

2. In a piston construction, the combination of a hollow piston provided with a packing ring groove in its outer wall, hollow bosses extending inwardly from the inner wall of said piston, said bosses being diametrically disposed and communicating with said groove, a packing ring disposed in said groove and composed of sections, plungers disposed in said bosses and connected to the sections of said ring, the inner ends of said plungers projecting beyond the inner ends of said bosses and provided with notches, and a curved spring following the contour of the inner wall of said piston and having its ends disposed in said notches and formed with eyes extending around portions of said plungers, and means for maintaining the ends of said spring in said notches.

In testimony whereof I have hereunto affixed my signature.

MICHAEL H. SULLIVAN.